July 27, 1954  R. A. SCHWEITZER  2,685,048
AUTOMOBILE SIGNAL SYSTEM
Filed Dec. 29, 1949

INVENTOR.
RUSSELL A. SCHWEITZER
BY Gregory S. Dolgorukov
ATTORNEY

Patented July 27, 1954

2,685,048

UNITED STATES PATENT OFFICE 2,685,048

AUTOMOBILE SIGNAL SYSTEM

Russell A. Schweitzer, Detroit, Mich.

Application December 29, 1949, Serial No. 135,693

3 Claims. (Cl. 315—79)

1

This invention relates to motor vehicles and more particularly to an improved system of signals therefor.

From the early days of motor vehicle use it was appreciated that a motor vehicle must have a signal at its rear end in order to give a visual indication to the driver of a following or trailing vehicle when the vehicle ahead of him is about to stop or to slow down. Accordingly a very useful and practical signal has been developed consisting of a small red light signal which is put on or made to flash, when brakes are being applied. With such systems, pressing the brake pedal down operates a switch to close an electric circuit into which an electric bulb, arranged behind a red lens of the signal, is interposed. Such system proved to be entirely adequate and dependable during the time of some years ago when traffic was light, and cars had engines of low power unable of quick acceleration.

However, as time went on, both the performance characteristics of motor vehicles and the traffic conditions changed greatly. There appeared powerful multiple-cylinder engines capable of accelerating much heavier vehicles to greater speeds and within shorter time than before; traffic congestions, rapidly operating traffic signal systems, and four wheel hydraulic brakes capable of quickly stopping a vehicle, made the above described signal system more and more inadequate.

With the ability of strong "self-energizing" brakes to bring to a virtual stop a vehicle travelling at a speed of 30 M. P. H. within the distance of 40–45 feet and within the time period of 2–3 seconds, the conventional brake pedal operated rear signal gives a warning virtually within 2 seconds of time and 40 feet distance from its stop. It has been found that the response time of a human system to a visual phenomenon may take a large portion of a second. For stopping a motor vehicle it is necessary to remove the right foot from the accelerator pedal, and bending the right leg at the knee to move the entire leg rearwardly and to the left by using the muscles of the leg, hip and part of the abdomen, place the foot on the brake pedal and press it down for application of brakes. Thus the response time for such operation before the brakes become effective may take 1–1½ seconds. Since a vehicle travelling at a speed of 30 M. P. H., now quite common even within city limits, moves approximately 44 feet per second, almost 100 feet of safe distance is required to take care of the movement of the car during the parasitic non-operation time and the

2 time during actual application of the brakes. Thus if both the leading and the trailing vehicle were travelling at 30 M. P. H., with the distance between them of less than 50 feet, the trailing vehicle may hit the stopping leading vehicle with considerable force. Such collisions now become more and more common, and they often result in children in the trailing cars hitting the windshield with their heads; occupants of leading vehicle, not expecting a shock, having their heads thrown rearwardly subjecting them to the possibility of dangerous neck injuries; in addition damage to the radiator grills and body of the vehicle, very costly to repair, also results in many cases.

The above described deficiency of the conventional signal system in the changed conditions has been further enhanced by the fact that a modern multiple-cylinder engine of a motor vehicle also provides by itself a powerful braking instrumentality in a motor vehicle. With the accelerator in its idling position and the engine operating at a higher speed than its idling speed, the kinetic energy of the moving vehicle is rapidly consumed by the engine, slowing down the vehicle travelling at higher speed very effectively and more conveniently than can be done with the wheel brakes. Therefore an average driver intending to slow down the vehicle for making a turn or in similar situations merely brings the accelerator to idling position and does not apply the brakes at all. While the vehicle is rapidly slowing down, the brake pedal operated signal is not brought into operation at all; yet under such conditions, and particularly when both the leading vehicle and the trailing vehicle travel above 30 M. P. H. a warning to the trailing vehicle is very important.

Numerous attempts have been made to reconstruct the driving controls of the motor vehicles and the existing brake-operated rear signal to remedy the above difficulties. For instance, several hundred constructions have been patented in which the above described parasitic time lag is sought to be eliminated by providing a unitary pedal for operating both the accelerator and the brakes. Since such constructions generally require considerable changes in the standardized driving controls as well as driving habits of the public, they have not yet received practical application.

I am also aware of the fact that with respect to the signal systems, it was proposed, for instance, to replace the conventional red warning signal at the rear of a vehicle by a composite green-amber-red signal, with green signal made visible when the vehicle is moving normally, amber signal made visible when the foot is taken off the accelerator pedal, and red signal made visible when brake pedal is depressed. Such signal systems also have not received practical application, in spite of their seeming solution of the problem discussed above. I have come to the realization that whatever might be the actual reasons for the fact that such systems are not in actual use, one of the most serious difficulties in their practical application would result from the fact that they attempt to introduce into the traffic a multitude of vehicle signals identical to the street and highway traffic control systems, but operating independently and perhaps inconsistently with it. A driver approaching an intersection controlled by a traffic light signal and watching both the traffic itself and the three-color intersection signal to which he responds almost automatically, would have in front of him several of similar systems, three or four perhaps, on the cars in front of him and in addition to the intersection signal, all showing perhaps different and inconsistent signals. Such a situation may be highly confusing, dangerous, and contributing to increasing nervous tension of the drivers. Furthermore, such undesirable situation would be particularly difficult in slow but heavy downtown traffic, where the simple conventional system of signals remains quite adequate.

One of the objects of the present invention is to provide an improved system of motor vehicle signals whereby the above discussed difficulties are overcome and largely eliminated in an effective and exceedingly simple manner and without introduction of signals affecting or requiring changes in the driving habits of the public.

Another object of the invention is to provide an improved motor vehicle signal construction having means whereby the time lag in giving warning to the trailing vehicle under conditions when such lag may be dangerous is eliminated, and the warning signal is given before the driver of the leading vehicle moves his foot to the brake pedal.

A further object of the present invention is to provide an improved signal system for motor vehicles, which system operates to give the driver of the trailing vehicle a visual signal not only when braking the leading vehicle is being effected with wheel brakes, but also when vehicle engine is used for such purpose.

A still further object of the invention is to provide an improved signal system for motor vehicles, which system retains the appearance of conventionalized rear signals changes in which would require, in effect, retraining all drivers to develop required responses to the changed signals.

A still further object of the invention is to provide an improved signal system for motor vehicles, which system is effective and operates to give the advance warning signals only under the conditions when such warning signals are desirable, such as when the leading vehicle travels above a predetermined speed, but which does not affect the conventionalized operation of the rear signal and does not give an advance warning signal when the same would be undesirable or confusing, such for instance as in heavy but slow traffic.

A still further object of the present invention is to provide an improved signal system for motor vehicles, which system attains the desired ends without the necessity of retraining or reinstructing driver, and, in fact, without an average driver being aware that changes in the signal system have been made.

It is an added object of the present invention to provide a motor vehicle signal system of the foregoing character which system is simple in construction, dependable in operation, is relatively inexpensive to manufacture, and easy to service or repair.

Further objects and advantages of the invention will be apparent from the following description, taken in connection with the appended drawing, in which.

Figure 1:
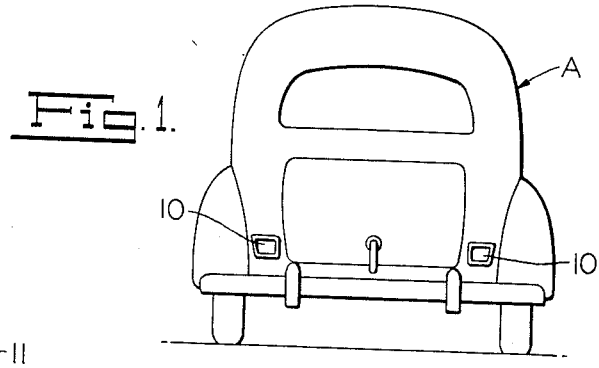
Fig. 1 is a rear elevational view of a motor vehicle having rear signal lights controlled with the aid of means herein disclosed.

It is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

In the drawing there is shown by way of example a signal system for a motor vehicle, embodying the present invention. The motor vehicle for which my improved signal system is adapted may be of any practicable type and be a passenger car, a truck, a bus, and in general any such vehicle having a brake pedal and an accelerator pedal and adapted to carry signal lights at its rear. In the drawing there is shown a passenger car, generally designated by the letter A and having two signal lights 10, 10 operatively arranged at its rear.

The vehicle A has provided therein a brake pedal 11 and an accelerator pedal 12 operatively arranged in a manner well known in the art to operate the brakes and to control the engine of the vehicle. The signal system for operating the rear lights 10, 10 comprises an electric circuit including a source of electric energy 13, such as a conventional storage battery, which is electrically connected by means of conductors 14 and 15 to the electric light bulbs arranged under red lenses to form signal lights 10, 10. In accordance with the common practice a larger portion of one of the conductors may be grounded on the metal structure of the vehicle. However in Fig. 2 such grounding is omitted for the sake of clarity of the diagram and ease of tracing of the circuits.

In the conductor 14 there is electrically interposed a switch 16 normally adapted to keep the conductor and the current interrupted but to close the conductor 14 when the brake pedal 11 is depressed, thus closing the circuit and causing the signals 10, 10 to go on. The construction so far described represents, in effect, a conventional system.

In accordance with the invention there is provided in the above main circuit a parallel circuit by-passing the switch 16 and formed by a conductor 17 having ends connected to the conductor 14. In the conductor 17 there are interposed in series two switches, a switch 18 and a switch 19.

The switch 18 is adapted to be normally closed and is operated by the accelerator pedal 12 to open when said pedal is depressed and to close when said pedal is released. The switch 19 is adapted to be normally open and is operated by a device 20 to close when the speed of the vehicle reaches in its increase a predetermined point.

In the present embodiment of the invention the device 20 is in the form of a centrifugal governor driven by the propelling system of the vehicle and particularly by that portion thereof which is permanently connected to the driving wheels of the vehicle. I prefer to connect the device 20 to the driving end of the transmission 21, thus making said device responsive to the speed of the vehicle rather than the speed of the vehicle engine. I also prefer to have the device set to close when the speed of the vehicle reaches 30 M. P. H. It should be understood that any other speed may be selected as such predetermined speed, if desired.

Figure 2:
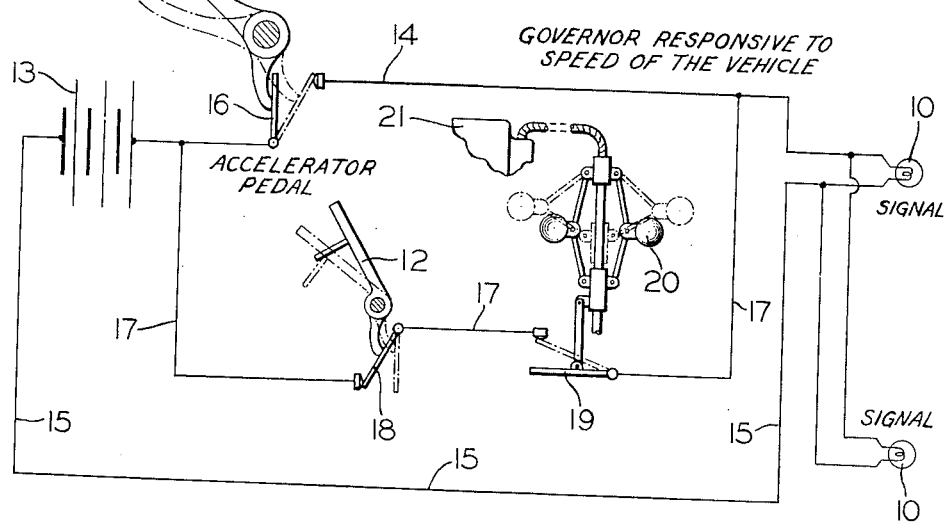
Fig. 2 is a diagram showing the electric signal circuit and its control means, embodying the present invention.

In operation, with the vehicle parked or standing still and its engine stalled or idling, the relative positions of the parts of my improved system will be shown in full lines in Fig. 2. Under such conditions while the switch 18 will be closed, the switches 16 and 19 will be open, both the main circuit and the parallel circuit being thus interrupted and the signal lights 10, 10 remaining dark.

When driving the vehicle at speeds under a predetermined point, such as my preferred point of 30 M. P. H., operation of the switch 18 is inconsequential since the device 20 will keep the switch 19 and the parallel circuit open. Under such conditions signal lights 10, 10 will be controlled by the brake pedal 11 only, causing such lights to go on when the brake pedal is depressed. Thus in slow driving my system operates substantially in the same manner as a conventional system, and the rear lights do not flash every time the accelerator pedal 12 is released, thereby preventing nervousness and confusion of drivers, which such frequent and unnecessary flashing of the rear signals might cause.

When the speed of the vehicle reaches the predetermined point of 30 M. P. H., the device 20 operates to close the switch 19, thereby making the signals 10, 10 controllable by the accelerator pedal 12. Under such conditions, with the vehicle travelling at the speed of 30 M. P. H. or higher and accelerator pedal depressed, both the switch 18 and the switch 16 will be open and the signals 10, 10 will remain dark in spite of the switch 20 being closed. However, as soon as the accelerator pedal is released for moving the foot for application of the brakes or for "coasting" i. e. using the engine as a brake for slowing down the vehicle, the switch 18 will close and the conductor 17 forming the parallel circuit will pass the current causing the signals 10, 10 to go on in spite of the fact that the brake pedal operated switch 16 is still open. The signals 10 will remain on until the accelerator pedal is depressed again for increasing the speed of the vehicle, providing the speed of the coasting vehicle did not drop below 30 M. P. H. to switch the lights off sooner. When the lights 10, 10 go on because of closing the switch 18 at speeds above 30 M. P. H., i. e., conditions of potential danger, depressing the brake pedal and closing the switch 16 will provide a second path for the electric current thus decreasing the electric resistance to the passage of the current and causing still brighter flashing of the signal lights 10, 10, thus providing an additional advantage important due to increased distances and speeds involved under such conditions. By proper selection of resistances of the circuits and the length of the conduits 17 this effect may be enhanced or diminished in any desired degree.

If desired, each of the lights such as 10, 10 may be made of two or three sections housed together but having separate bulbs controlled by circuits in such a manner that one of the sections is to go on when headlights are switched on for night driving; the second section to go on when the accelerator pedal is released with the vehicle travelling above predetermined speed, as herein disclosed; and the third section to go on when the brakes are applied. Modification in the wiring to effect such a control of the rear lights can be easily effected in a manner well known in the art.

While the device 20 as illustrated in the drawing is of the centrifugal type, it will be understood that the invention is not limited to such type of the speed responsive devices, and that devices such as those constructed on magnetic drag principle or on the principle of a tachometer, as well as devices of other types may be also employed.

Figure 3:
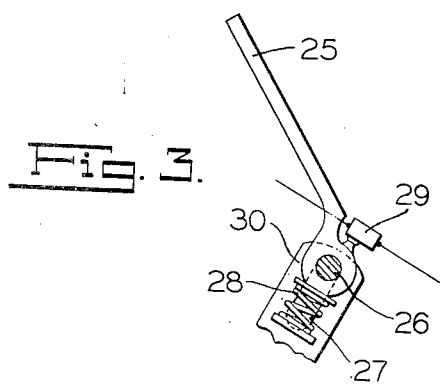
Fig. 3 is a view showing an accelerator operated switch of a modified construction.

Fig. 3 shows an accelerator pedal which operates to close the switch only when the foot is fully removed from the pedal rather than when it is merely brought into an idling position. Such a construction ensures that the rear signals will flash only when the brakes are about to be applied. In such a construction the accelerator pedal 25 is hinged in a slotted bracket 30 with its hinge 26 sliding in a slot 27 and normally maintained at the top end thereof by the spring 28, keeping the switch 29 closed. Holding foot on the pedal 25 even without pressing on its free end, will overcome the resistance of the spring 28 and open the switch 29. The switch 29 is suitably housed in order to prevent the driver's foot from interfering with its operation.

By virtue of the above construction, objects of the present invention listed above and numerous additional advantages are attained.

I claim:

1. A signal system for a motor vehicle having a brake pedal and an accelerator pedal, said system comprising an electric circuit including a source of electric energy, a red light signal operatively arranged at the rear of the vehicle and including an electric light operatively interposed in said circuit, an electric switch operable by said brake pedal to close said circuit when pressure is applied to said pedal and to open said circuit when pressure is released, an electric conductor connected to said circuit in parallel, a second electric switch electrically interposed in said conductor and operable by the accelerator to close said conductor for passage of current when the accelerator is brought into its idling position and to break said circuit when the accelerator pedal is depressed, an additional normally open switch electrically interposed into said conductor and means responsive to the speed of the vehicle and which closes said additional switch at speeds of the vehicle above approximately 30 M. P. H. and thereby maintains the accelerator operated switch effective at said speeds.

2. A signal system as defined by the preceding claim 1 said speed responsive means comprising a centrifugal governor device drivingly connected to the propelling system of the vehicle beyond the transmission thereof to control the speed responsive switch.

3. In a signal system for a motor vehicle having a brake pedal, an electric circuit including a source of electric energy, a red signal light operatively arranged at the rear of the vehicle and interposed in said circuit, and an electric switch interposed in said circuit and operable by said brake pedal to close said circuit when pressure is applied to said pedal and to open said circuit when pressure is released; an accelerator pedal light-switching device comprising an accelerator pedal, and an electric conductor connected in parallel with said circuit to by-pass the brake switch, an electric switch electrically interposed in said conductor and operable by the accelerator pedal to close said conductor for passage of current when the accelerator is brought into its idling position and to break said circuit when the accelerator pedal is depressed, a second normally open switch interposed in said conductor, a centrifugal governor driven by the propelling system of the vehicle and connected to said second switch to close the same when the speed of the vehicle exceeds a predetermined speed of at least 25 M. P. H., whereby release of pressure upon the accelerator pedal at speeds above 30 M. P. H. operates to actuate the circuit to apply the light, said accelerator switch being inoperative below the predetermined speed.

References Cited in the file of this patent

UNITED STATES PATENTS

| Number | Name | Date |
|---|---|---|
| 1,498,580 | Rule | June 24, 1924 |
| 1,663,691 | Everett | Mar. 27, 1928 |
| 2,096,069 | Seiden | Oct. 19, 1937 |
| 2,128,769 | Finnell | Aug. 30, 1938 |
| 2,260,680 | Nelsen | Oct. 28, 1941 |